(12) United States Patent
Srinivasan et al.

(10) Patent No.: US 11,090,606 B2
(45) Date of Patent: Aug. 17, 2021

(54) GAS-LESS ELECTROLYTIC DEVICE AND METHOD

(71) Applicant: DIONEX CORPORATION, Sunnyvale, CA (US)

(72) Inventors: Kannan Srinivasan, Tracy, CA (US); Sheetal Bhardwaj, Fremont, CA (US); Rong Lin, Santa Clara, CA (US)

(73) Assignee: Dionex Corporation, Sunnyvale, CA (US)

( * ) Notice: Subject to any disclaimer, the term of this patent is extended or adjusted under 35 U.S.C. 154(b) by 662 days.

(21) Appl. No.: 14/097,638

(22) Filed: Dec. 5, 2013

(65) Prior Publication Data

US 2015/0157976 A1 Jun. 11, 2015

(51) Int. Cl.
*B01D 53/32* (2006.01)
*C25B 15/08* (2006.01)
(Continued)

(52) U.S. Cl.
CPC .............. *B01D 53/326* (2013.01); *C25B 1/04* (2013.01); *C25B 9/73* (2021.01); *C25B 15/08* (2013.01);
(Continued)

(58) Field of Classification Search
CPC .... C25B 1/10; C25B 1/24; C25B 1/00; C25B 9/73; C25B 1/04; C25B 15/08; C25B 9/166; B01D 53/326; B01D 61/48; B01D 61/44; B01D 19/0031; B01D 15/36; B01D 15/10; G01N 30/96; G01N 2030/965; G01N 30/02; G01N 30/26; G01N 30/34; C02F 1/46–4698; C02F 1/4676; C02F 1/4672; C02F 1/4674; C02F 1/46114; C02F 1/42; C02F 1/4695; C02F 2201/46145; C02F 2103/023; C02F 2201/46115; C02F 2103/42; C02F 2303/04; Y02E 60/36; Y02E 60/50; B01J 47/08; B01J 49/30; H01M 4/8605; H01M 4/90; H01M 4/926
See application file for complete search history.

(56) References Cited

U.S. PATENT DOCUMENTS 3,230,046 A 1/1966 Beroza
4,131,526 A * 12/1978 Moeglich .................. C02F 1/46
205/753
(Continued)

FOREIGN PATENT DOCUMENTS

CN 1809407 A 7/2006
EP 0066676 A1 12/1982
(Continued)

OTHER PUBLICATIONS

Dionex. ICS-2100 Ion Chromatography System Operator's Manual. Mar. 2009.*
(Continued)

*Primary Examiner* — Xiuyu Tai

(57) ABSTRACT

An electrolytic device, e.g. a suppressor, including at least two flow-through channels separated by a charged membrane barrier, and a catalyst, for combining hydrogen and oxygen gas, together with ion exchange material, disposed in one of the channels. Also, a method for simultaneous electrolysis and catalytic gas elimination in a channel of the device is described.

5 Claims, 6 Drawing Sheets

(51) Int. Cl.
  *G01N 30/96* (2006.01)
  *C25B 1/04* (2021.01)
  *C25B 9/73* (2021.01)

(52) U.S. Cl.
  CPC ....... *G01N 30/96* (2013.01); *G01N 2030/965* (2013.01); *Y02E 60/36* (2013.01)

(56) References Cited

U.S. PATENT DOCUMENTS

| | | | |
|---|---|---|---|
| 4,430,177 A | | 2/1984 | McIntyre et al. |
| 4,539,086 A | * | 9/1985 | Fujita ........................ C25B 1/02 204/263 |
| 4,690,741 A | * | 9/1987 | Walsh, III ........... C02F 1/46114 204/242 |
| 4,956,071 A | | 9/1990 | Giuffrida et al. |
| 5,045,204 A | | 9/1991 | Dasgupta et al. |
| 5,248,426 A | | 9/1993 | Stillian et al. |
| 5,352,360 A | | 10/1994 | Stillian et al. |
| 5,419,816 A | * | 5/1995 | Sampson ................ B01D 61/48 204/263 |
| 5,597,481 A | | 1/1997 | Stillian et al. |
| 5,633,171 A | | 5/1997 | Small et al. |
| 5,720,869 A | | 2/1998 | Yamanaka et al. |
| 6,027,643 A | | 2/2000 | Small et al. |
| 6,036,921 A | | 3/2000 | Small et al. |
| 6,077,434 A | | 6/2000 | Srinivasan et al. |
| 6,093,327 A | | 7/2000 | Anderson, Jr. et al. |
| 6,225,129 B1 | | 5/2001 | Liu et al. |
| 6,228,333 B1 | | 5/2001 | Mueller-Lierheim |
| 6,315,954 B1 | | 11/2001 | Small et al. |
| 6,316,270 B1 | | 11/2001 | Small et al. |
| 6,316,271 B1 | | 11/2001 | Small et al. |
| 6,558,551 B1 | | 5/2003 | Anderson, Jr. et al. |
| 6,562,628 B1 | | 5/2003 | Liu et al. |
| 6,610,546 B1 | | 8/2003 | Liu et al. |
| 6,682,701 B1 | | 1/2004 | Liu et al. |
| 6,752,927 B2 | | 6/2004 | Srinivasan et al. |
| 6,808,608 B2 | | 10/2004 | Srinivasan et al. |
| 6,972,337 B1 | | 12/2005 | Onimus et al. |
| 7,074,331 B2 | | 7/2006 | Allington et al. |
| 7,220,698 B2 | | 5/2007 | Yunoki et al. |
| 7,329,346 B2 | | 2/2008 | Liu et al. |
| 7,473,354 B2 | | 1/2009 | Liu et al. |
| 7,585,679 B1 | | 9/2009 | Liu et al. |
| 7,704,749 B2 | | 4/2010 | Srinivasan et al. |
| 8,021,555 B2 | | 9/2011 | Liu et al. |
| 8,043,507 B2 | | 10/2011 | Liu et al. |
| 8,133,373 B2 | | 3/2012 | Small et al. |
| 8,293,099 B2 | | 10/2012 | Dasgupta et al. |
| 2004/0048389 A1 | | 3/2004 | Liu et al. |
| 2005/0026005 A1 | | 2/2005 | Chlistunoff et al. |
| 2005/0103644 A1 | * | 5/2005 | Wilkins ................ B01D 61/48 205/751 |
| 2005/0136309 A1 | | 6/2005 | Masel et al. |
| 2006/0131179 A1 | | 6/2006 | Cavalca |
| 2006/0186046 A1 | | 8/2006 | Liu et al. |
| 2007/0062873 A1 | | 3/2007 | Liu et al. |
| 2007/0095676 A1 | | 5/2007 | Yamada et al. |
| 2008/0264780 A1 | * | 10/2008 | Kato ........................ C25B 1/04 204/252 |
| 2009/0188798 A1 | | 7/2009 | Riviello |
| 2010/0084280 A1 | | 4/2010 | Gilliam et al. |
| 2013/0240370 A1 | | 9/2013 | Bulan et al. |
| 2016/0228820 A1 | * | 8/2016 | Hayes .................... B01D 61/52 |

FOREIGN PATENT DOCUMENTS

| | | | |
|---|---|---|---|
| EP | 0145262 A2 | 6/1985 | |
| EP | 0555962 A2 | 8/1993 | |
| EP | 1205750 A2 | 5/2002 | |
| GB | 1272619 A | * 5/1972 | ............... C25B 1/00 |
| JP | 58174285 | 10/1983 | |
| JP | 01234585 | 9/1989 | |
| JP | 03054457 | 3/1991 | |
| JP | 5256835 | 10/1993 | |
| JP | 7120445 | 5/1995 | |
| WO | 9627793 A1 | 9/1996 | |
| WO | 9832011 A1 | 7/1998 | |
| WO | 9938595 | 8/1999 | |
| WO | 9956849 | 11/1999 | |
| WO | 0204940 A1 | 1/2002 | |
| WO | 2004094030 A2 | 11/2004 | |
| WO | 2005047885 A2 | 5/2005 | |
| WO | 2006091404 A2 | 8/2006 | |
| WO | 2007035346 A1 | 3/2007 | |
| WO | 2009105387 A1 | 8/2009 | |
| WO | 2011066293 A1 | 6/2011 | |
| WO | 2013018843 A1 | 2/2013 | |

OTHER PUBLICATIONS

Hoffman, "Dobereiner's lighter," Am. Sci. Online, 86(4), 326, Jul.-Aug. 1998.

Kim, D-H et al, "Determination of Trade Anions in Concentrated Hydrogen Peroxide by Direct Injection Ion Chromatography with Conductivity Detection after Pt-Catalyzed On-Line Decomposition," Bull. Korean Chem. Soc., 20(6), 696-700, 1999.

Kim, Y-J, "Effect of Noble Metal Addition on Electrochemical Polarization Behavior of H2 Oxidation and O2 Reduction on 304SS in High-Temperature Water," GE Res. Dev. Ctr. 97CRD203, Class 1, Feb. 1998.

Li et al., "Removal of dissolved oxygen in ultrapure water production using a membrane reactor," Chem Eng Sci, 50(22), 3547-3556, 1995.

Lin, C-W. et al., "Toward orientation-independent design for gas recombination in closed-loop eletroosmotic pumps," Sensors and Actuators, 128, 334-339, 2007.

Owens et al., "Demonstrating Catalysis with a Bangl," Chem. Educator, 1(4), 1-4, 1996.

Reaction Dynamics (2/10295; Randal Nelson; Thomas Perigrin), Webarchive date: Jul. 28, 2001, 4 pages.

Robinson et al., "Inculet. A new type of ozone generator using Taylor cones on water surfaces," IEEE Transactions on Industry Applications, 34(6), 1218-1224, 1998.

Selvaganapathy et al., "Bubble-free electrokinetic pumping," J of Microelectromechanical Systems, 11(5), 448-453, 2002.

Sobczyk et al., "Activation of ammonia dissociation by oxygen on platinum sponge studied with positron emission profiling," J. of Catalysis, 219, 156-166, 2003.

Stipe et al., "Atomistic studies of O2 dissociation on Pt(111) induced by photons, electrons, and by heating," J. Chem. Phys. 107(16), 6443-6447, 1997.

Tan, X., et al., "Investigation of novel membrane reactors for removal of dissolved oxygen from water," Chem Eng Sci, 55(7), 1213-1224, 2000.

Verheij et al., "Hydrogen adsorption on oxygen covered Pt(111)," Surface Science, 324, 185-201, 1995.

Yao, S., et al., "Porous glass electroosmotic pumps: design and experiments," J of Colloid and Interface Sci, 268(1), 143-153, 2003.

Zambelli et al., "Complex pathways in dissociative adsorption of oxygen on platinum," Letters to Nature, 390:495-497, 1997.

* cited by examiner

GAS-LESS ELECTROLYTIC DEVICE AND METHOD

BACKGROUND

Electrolytic devices generate electrolytic gases from the water splitting reactions when a DC potential in excess of about 1.5 volts is applied. An electrolytic suppressor used in ion chromatography relies on the electrolytic water splitting reactions to supply regenerant ions for suppression. U.S. Pat. Nos. 7,329,346 and 7,585,679, disclose that when the suppressor waste solution is used as an eluent for chromatography, it may be treated with a platinum catalyst in a variety of forms to catalytically recombine electrolytically generated hydrogen and oxygen in the eluent to form deionized water.

SUMMARY

In one embodiment of the invention, an electrolytic device is provided suitable for use in a system for detecting sample analytes in a liquid sample. The device comprises a housing including at least first and second adjacent flow-through channels separated by a charged barrier having exchangeable ions capable of passing ions of only one charge, positive or negative, and of blocking bulk liquid flow; first and second electrodes in electrical communication with the first and second channels, respectively; and a catalyst, for combining hydrogen and oxygen gas, disposed in the first channel. The catalyst may also be for removing hydrogen peroxide.

In another embodiment, a method for simultaneous electrolysis and catalytic gas elimination is provided using the above electrolytic device. The method comprises flowing first and second aqueous liquid streams at least one of which includes ions of the same charge, positive or negative, as the exchangeable ions of the barrier through the first and second channels, respectively, while applying an electric current between the first and second electrodes to generate hydrogen and oxygen gas and transport at least some of the ions between the first and second channels, and catalytically combining the generated oxygen and hydrogen in the aqueous liquid stream in the first channel by contact with the first catalyst. The method may further include catalytically removing hydrogen peroxide in the aqueous liquid stream in the first channel by contact with the first catalyst.

DETAILED DESCRIPTION OF EMBODIMENTS

The present invention is directed to an electrolytic device including at least two flow-through channels separated by a charged barrier having exchangeable ions capable of passing ions of only one charge, positive or negative, and spaced electrodes in electrical communication with the channels across the flow path of aqueous solutions through the channels. A catalyst is provided in one of the channels for combining hydrogen and oxygen gas and removing hydrogen peroxide. The catalyst can remove hydrogen peroxide by the decomposition of hydrogen peroxide into water and oxygen. As will be discussed, the catalyst may be of the type described for the ones disposed in the catalytic gas elimination columns of U.S. Pat. Nos. 7,329,346 and 7,585,679, incorporated by reference. The electrolytic device of the present invention first will be described in the form of an electrolytic sandwich suppressor having three channels separated by two of such charged barriers in a suppressed ion chromatography system.

Figure 1:
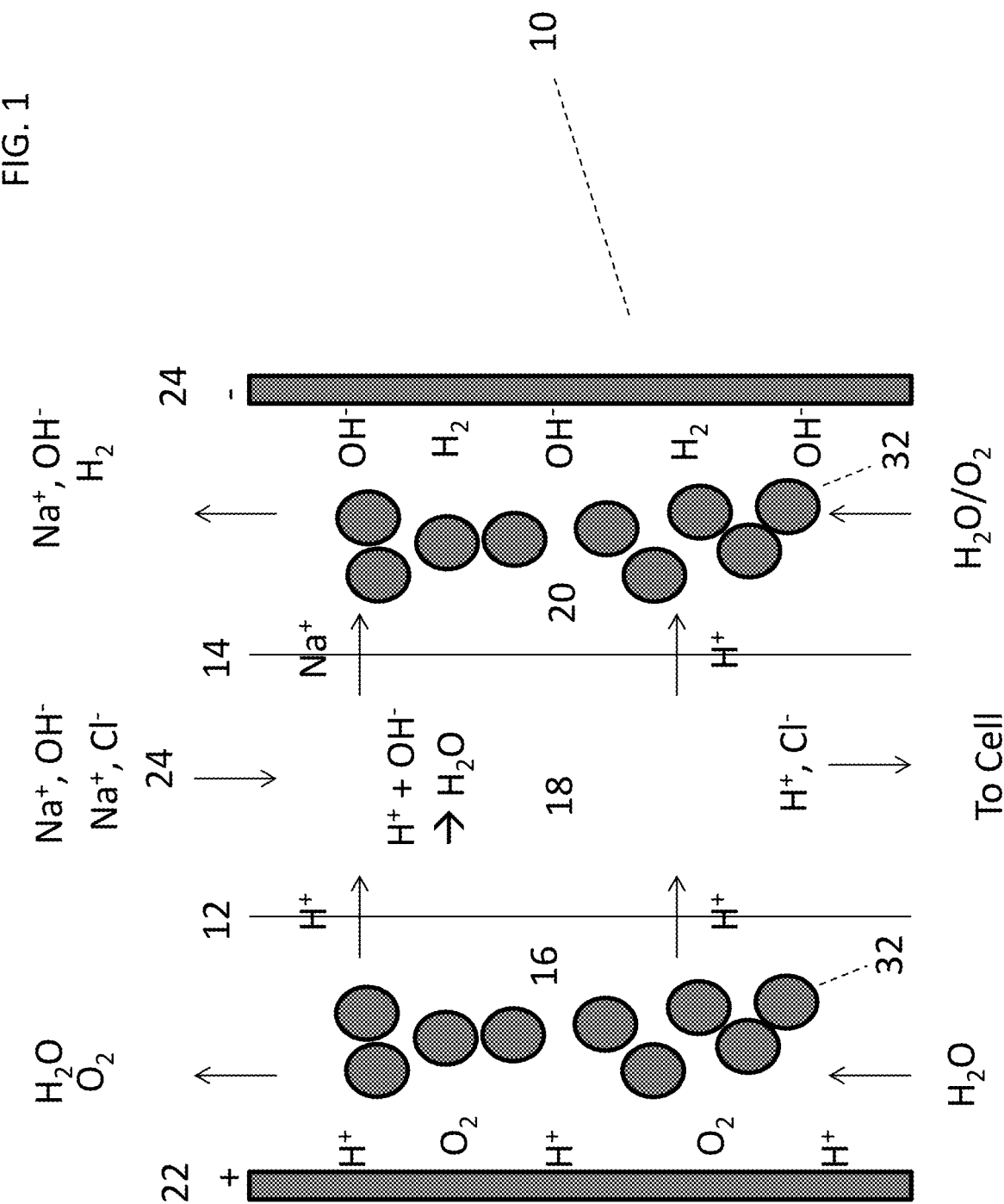
FIG. 1 illustrates an electrolytic device according to the invention including catalyst in two channels of a three channel device.

Referring to FIG. 1, a device is illustrated in the form of a sandwich suppressor including a central sample stream flow channel defined on both sides by ion-exchange membrane barriers to the exterior of which are an ion receiving flow channel and an ion source flow channel, respectively. The suppressor may be the same as the one illustrated in FIGS. 3-5 of the U.S. Pat. No. 6,077,434 (the "'434 patent"), incorporated by reference, except for the catalyst described hereinafter. The suppressor may be used in any suppressed ion chromatography system such as the one illustrated in the simplified schematic system of FIG. 1 of the '434 patent, also incorporated by reference. Such a system includes a chromatographic separator, typically packed with chromatographic separation medium such as a packed bed or flow-through monolith of ion exchange material, in fluid communication with the inlet of the central flow channel of the sandwich suppressor. The suppressor suppresses the conductivity of the eluent electrolyte but not that of the ions separated in the separation. The effluent from the suppressor is directed to a detector for detecting the separated ions.

Referring again to FIG. 1 herein, the electrolytic suppressor device 10 includes a housing, not shown, retaining first and second adjacent charged barriers 12 and 14 having exchangeable ions capable of passing ions of only one charge, positive or negative, and of blocking bulk liquid flow. The exchangeable ions of barriers 12 and 14 are of the same charge. The housing includes three adjacent flow-through channels 16, 18 and 20. Central channel 18 is defined by barriers 12 and 14. Channels 16 and 20, (referred to sometimes herein as the regenerant channels or flank channels) are defined on one side by the outside of barriers 12 and 14, respectively, and on the other side by the electrodes or the inner walls of the housing. In operation as a suppressor for anion analysis, channel 16 is an ion-source flow channel and channel 20 is an ion-receiving flow channel. Electrodes 22 and 24 are mounted in the housing in electrical communication with channels 16 and 20, respectively, and with channel 18 to pass a current across the solutions flowing through the channels. Electrodes 22 and 24 may be disposed at the outer sides of channels 16 and 20, respectively, to contact the solution flowing through the channels. The functions of the suppressor and flow of solutions through the suppressor may be the same as described in the '434 patent except for the catalysis in the suppressor of the present invention described below. Such catalysis eliminates the $H_2$ and $O_2$ flowing out of channels 35 and 37 shown in FIG. 4 of the '434 patent.

As illustrated, central channel 18 includes packing such as a charged or uncharged screen. Also, channels 16 and 20 may also include charged or uncharged packing respectively, in various forms, such as a screen, or a monolith, to be described.

The system illustrated is for anion analysis and includes sodium hydroxide as the electrolyte in the effluent to be converted into weakly ionized form ($H_2O$) in the suppressor. Thereafter, the solution passes through the conductivity cell of a detector and may be recycled to flow channels 16 and 20. The ion-exchange barriers allow the positively charged sodium and hydronium ions to permeate together across barrier 14.

A suitable ion-exchange membrane barrier for this purpose is a sulphonated polystyrene grafted PTFE sheet. Hydroxide ions tend not to permeate the membrane sheet because of donnan exclusion forces. Thus, the sodium hydroxide stream is converted to deionized water in the chromatography effluent or sample flow channel 18, and the sodium ions permeate the membrane sheet barrier 14 and are eventually dispersed in the flow channel 20 as NaOH which can ultimately be routed to waste. Applying a potential across electrodes 22 and 24 increases the kinetics of ion flow across barrier 12 and 14 and thereby increases capacity and, thus, the suppression efficiency of the suppressor device.

As illustrated, the positively charged sodium ions of the electrolyte in channel 18 electromigrate under the influence of the electric field across barrier 14 into channel 20. At the same time the hydronium ions generated at the anode 22 by electrolysis of water, flow across flow channel 16, and then across membrane 12 into flow channel 18 to form water with hydroxide ions therein. The sodium ions, being attracted to the negative electrode, are more rapidly removed leading to an increase in the capacity of the suppressor device. Any excess hydronium transported across barrier 12 eventually ends up in channel 20 and combines with hydroxide generated at the cathode to form water.

In the electrolytic operation of the system of FIG. 1, in flow channel 16, hydronium ion is generated at the anode according to the following equation and passes through membrane 12

$$H_2O - 2e^- \rightarrow 2H^+ + \tfrac{1}{2}O_2 \tag{1}$$

In flow channel 18, the sodium ion passes through membrane 14 under the influence of the electric field.

In flow channel 20, the sodium ion is converted to NaOH with hydroxide ion produced at the cathode by the following equation:

$$2H_2O + 2e^- \rightarrow 2OH^- + H_2 \tag{2}$$

Also any hydronium migrating across the membrane 14 is converted to water at the cathode according to the following equation:

$$OH^- + H^+ \rightarrow H_2O \tag{3}$$

In one embodiment, screens disposed in channels 16 and 20 are functionalized or charged with exchangeable ions of the same charge as those of barriers 12 and 14. Such screens provide a direct site-to-site contact between the barriers for the ions to be diffused through the membranes.

The invention has been illustrated for the device of FIG. 1 for anion analysis, e.g. using the eluent of column 10, lines 49-54 of FIG. 1 of the '434 patent. It is also applicable to cation analysis as described at column 10, line 55 through column 11, line 13 of the '434 patent.

The principal difference of the present invention from the suppressor of FIG. 1 of the '434 patent is the placement of catalyst 32 in channels 16 and 20 for the illustrated sandwich suppressor (or in one channel of a two-channel device using a single barrier to be described below). The catalyst may be similar in form and function to the catalyst described in U.S. Pat. Nos. 7,329,346 and 7,585,679 as will be described.

The principles of operation of the catalyst and the use of platinum or other suitable catalyst materials may be the same as the principles and catalysts described at column 6, line 12 through column 7, line 34 of U.S. Pat. No. 7,329,346, incorporated herein by reference. Forms of the catalyst in a column are described at column 7, lines 22-34 include packing the column with pure Pt metal particles, mesh or foil in a column with fritted flow-through end pieces, or packing the fritted column with inert substrates coated with Pt. These forms of the catalyst can be packed into the suppressor channels 16 and 20 herein with similar fritted end pieces. When ion exchange material is used with the catalyst, ion exchange packing in channels 16 and 20 may take a variety of forms such as a packed bed of ion exchange particles mixed with particles of Pt-coated inert substrate particles forming a mixed bed of ion exchange particles and catalyst particles. Such a mixed bed may be of the type described at column 17, line 31 through column 18, line 9 of U.S. Pat. No. 7,585,679 incorporated by reference, for the catalytic gas and ion species removal device (the "CGISRD") of the '679 patent. As described, the ion exchange packing may be mixed with the catalyst or be upstream or downstream of it. This relationship also applies to the present invention so long as the ion exchange material and catalyst are both in at least one of the channels of the suppressor. The catalyst can be preferably made from ion exchange materials and have residual ion exchange capacity remaining after the catalyst deposition step. In this case a substantial portion of the surface area available on the ion exchange substrate material can be reacted with the catalyst component by adjusting the catalyst monomer concentration. A preferable ratio of available residual ion exchange capacity to utilized capacity in the catalyst bonding process is in the range of 1:10 more preferably 3:10 and most preferably about 1:1. The ion exchange capacity can be measured by known methods, that measure the break through capacity, such as by converting the ion exchange material from one form to another. For example using a cation exchange material in the sodium form, by treating the material with an acid the removed sodium can be monitored using a conductivity or pH detector and the total exchange capacity in equivalents can be inferred. It should be noted the ion exchange material capacity can be measured before and after deposition of the catalyst to get the ratio of available residual ion exchange capacity to utilized capacity.

In another embodiment ion exchange materials can be added and used along with the catalyst materials. In the simplest form in one embodiment when the ion exchange materials are in the resin bead form the material can be mixed with catalyst deposited ion exchange resin or catalyst deposited neutral materials such as carbon beads. In this case the residual ion exchange capacity can be measured as discussed above. A preferred ratio of the ion exchange resin to the catalyst can be expressed in terms of weight. A preferred ratio could be in the regime 10:1, more preferably 3:1 and most preferably in the 1:1 ratio. Higher amounts of catalyst resin is avoided to keep the costs low although as those skilled in the art would infer the above ratios can be reverted to have an excess level of catalyst resin. The absolute amount of catalyst required can be inferred via experimentation by weighing known amounts and then monitoring the catalytic conversion of known concentrations of hydrogen and oxygen gas to water. One means of monitoring is by detecting the residual bubbles using an optical bubble sensor ERC 10 controller sold by Thermo Fisher Scientific, Sunnyvale. The electrolytic water splitting reaction can be used to generate known amounts of hydrogen and oxygen by applying a known current across the electrodes in the regenerant channel of a suppressor device. Deionized water is supplied to the eluent and regenerant channel in the above case. The current is adjusted for a given catalyst amount to determine the maximum hydrogen and oxygen concentration that a given catalyst can recombine to deionized water. The minimum amount is usually exceeded to ensure adequate capacity for the catalytic function and also to account for any variations in the flow rate or applied current. The residual ion exchange capacity aids in keeping the resistance of the device low. The amount can be adjusted to ensure that the device resistance is low for a given application. The device resistance can be monitored for a given current by observing the generated voltage for a given application. It is preferred as per the present invention to keep the voltage to a minimum to reduce the operational wattage of the device. Preferably the wattage of the suppressor device is <5 watts more preferably ≤3 watts.

As described in the prior art the suppressor ion exchange materials can be made from substrates in various configurations such as screens, resin beads, monolithic phases and the like. The catalyst material can be made from the above materials or from other neutral materials such as carbon beads or from noble metals such as palladium or platinum metal foils or wires or frits or wool. Materials with high surface area such as porous materials are preferred for the catalytic function.

As set forth at column 17, line 58 through column 18, line 9 of the '679 patent for the CGISRD, the ion exchange medium may be a monolith of the type described in U.S. Pat. No. 7,074,331. Also, the catalyst may be irreversibly bound as by electrostatic binding, as a coating to the ion exchange medium, as described for the CGISRD at column 18, line 10 through column 19, line 17 of the '679 patent.

In the embodiment of FIG. 1 herein, the electrolysis gases are recombined in the suppressor regenerant channel(s), thereby eliminating the need for any external columns or platinum catalyst devices. The addition of the catalyst in the regenerant channel(s) in the suppressor device allows for lowering the electrical resistance in the regenerant channel thereby keeping overall operational resistance of the device low. This, in turn, lowers the operational wattage and associated heat and noise. It also lowers detection noise since the bubble induced current disturbances are minimized by removing the bubbles. It also minimizes peroxide concentration in the suppressor device thereby minimizing damage to the ion exchange components within the suppressor.

In the embodiment of FIG. 1 for anion analysis, the regenerant flow from anodic regenerant channel 16 may be routed to the cathodic regenerant channel 20 thereby allowing the correct stoichiometry required for recombining the hydrogen and oxygen gas. In this case the catalyst enables the recombination and elimination of the gas in the cathodic regenerant channel. For cation analysis, the cathodic regenerant flow (from channel 20) may be routed to anodic channel 16 for recombination of the gases.

The invention has been described for the device of FIG. 1 which is a sandwich suppressor including three channels and two charged barriers. However, it is also applicable to a two-channel suppressor including a sample flow channel and a single regenerant flow channel separated by a charged barrier such as described for FIGS. 5 and 6 of U.S. Pat. No. 6,077,434, incorporated by reference. The present invention distinguishes from this two-channel suppressor by the presence of catalyst in the regenerant flow channel.

The devices of the present invention are used in a method for simultaneous electrolysis and catalytic gas elimination. In the method, described generally for a two-channel device, first and second aqueous liquid streams at least one of which includes ions of the same charge, positive or negative, as the exchangeable ions of at least one charged barrier, flow through the first and second channels, while an electric current is applied between the first and second electrodes which generates hydrogen and oxygen gas. At least some of the ions are transported between the first and second channels, and the generated oxygen and hydrogen are catalytically combined in the aqueous liquid stream in the channel by contact with said first catalyst.

The embodiment of FIG. 1 is illustrated for use as a suppressor. There, the first aqueous liquid stream comprises a sample stream includes separated sample analyte ions, typically separate chromatographically, in an eluent including counterions of opposite charge to the separated sample ions. The counterions are of the same charge as the first charged barrier exchangeable ions, and are suppressed in the second channel.

In one method using the sandwich suppressor of FIG. 1, for anion analysis, a first aqueous stream flows from channel 16 to channel 20, and water is electrolyzed in both channels to generate hydrogen in one channel and oxygen gas in the other one. The generated hydrogen and oxygen gases are recombined in the first channel by contact with the catalyst therein to generate water. The polarities of the electrodes and barriers and the direction of flow between channels 16 and 20 is reversed for cation analysis.

Figure 2:
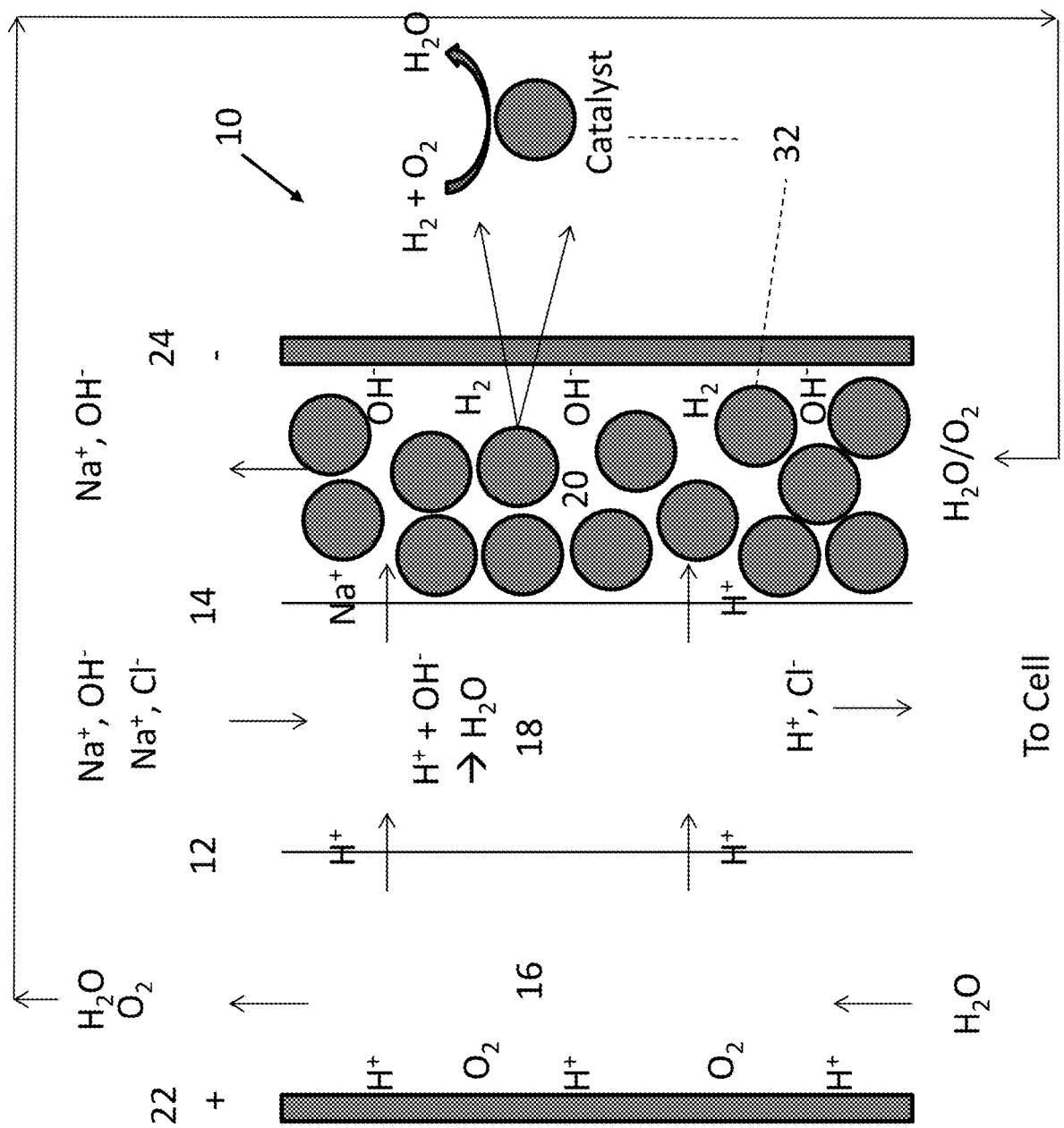
FIG. 2 illustrates an electrolytic device according to the invention including catalyst in one channel of a three channel device.

Referring to FIG. 2 another embodiment of the present invention is illustrated. This embodiment is similar to the embodiment of FIG. 1 except the catalyst resin 32 is only added to the ion-receiving flow channel 20 and the device is used as a suppressor for anion analysis. As opposed to FIG. 1, in this embodiment the catalyst resin is only added to one regenerant channel. In operation as discussed above formation of oxygen gas occurs at the anode and when this is routed to the cathode where hydrogen gas is generated, one can combine the oxygen gas with the hydrogen gas on the catalyst surface 32 to form water. This formation of water reduces the gas formation in the channel 20 as per the present invention.

Figure 3:
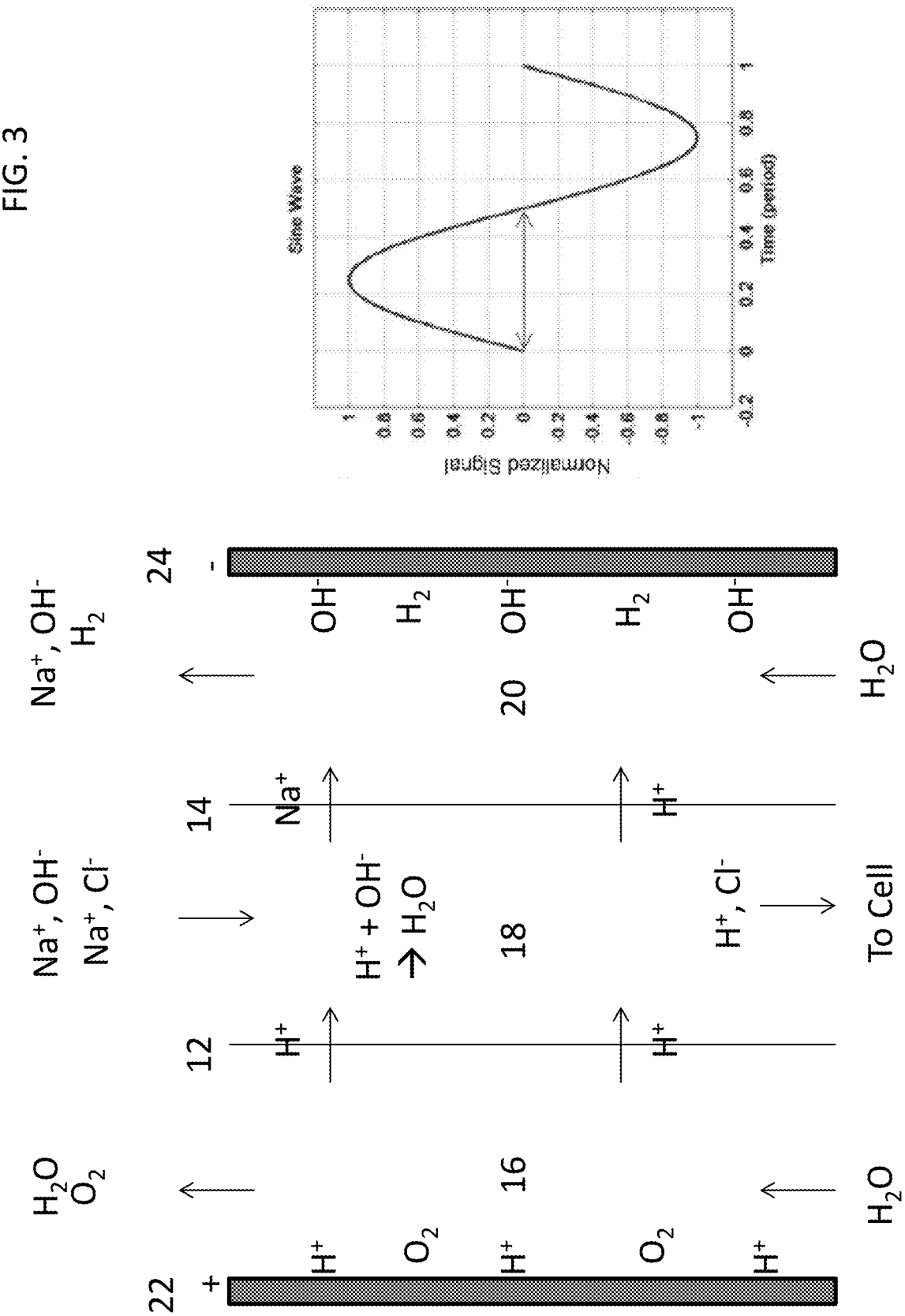
FIG. 3 illustrates an electrolytic device operated with an A/C voltage and showing a first half cycle of the A/C voltage.
Figure 4:
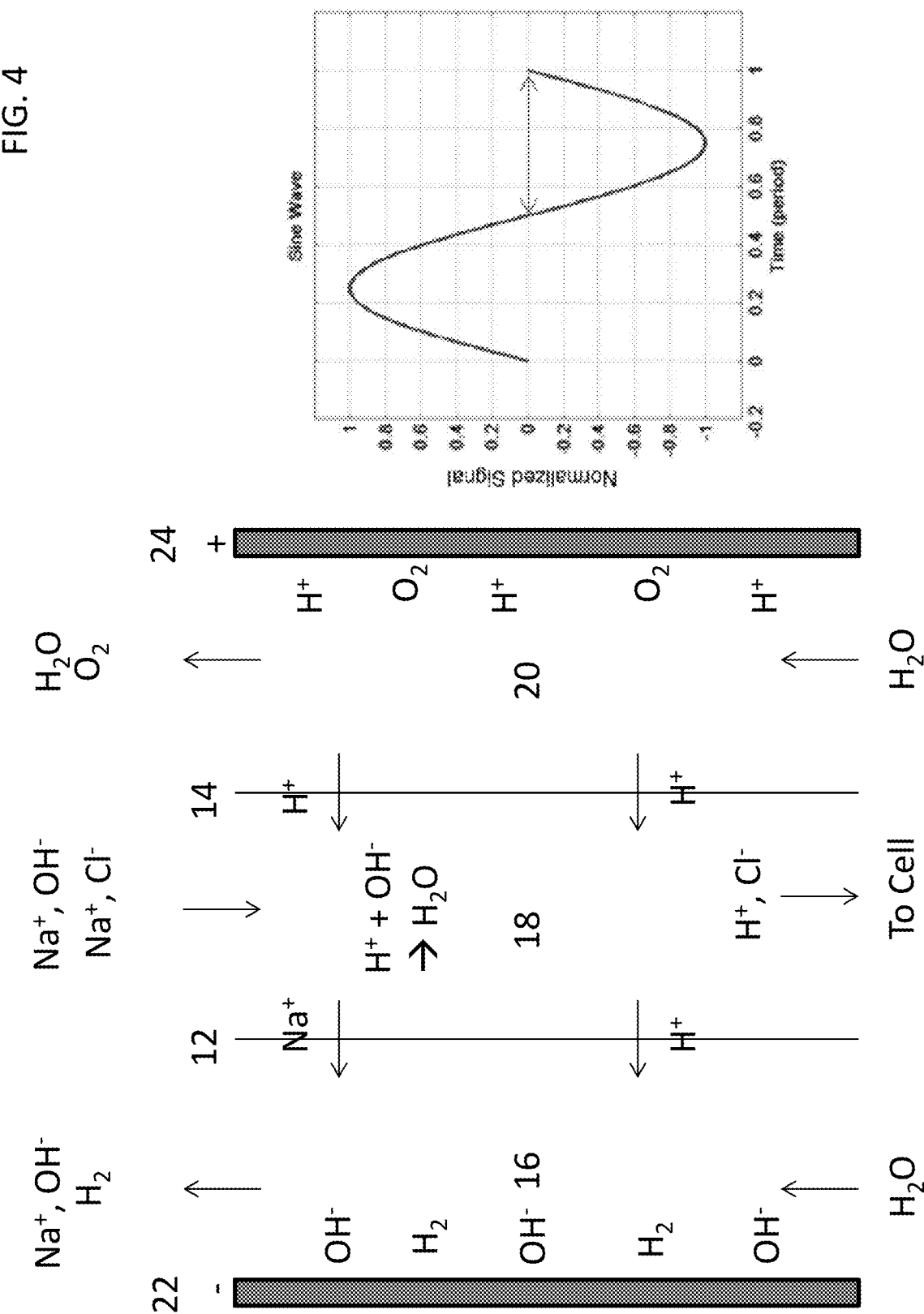
FIG. 4 illustrates an electrolytic device operated with an A/C voltage and showing a second half cycle of the A/C voltage.
Figure 5:
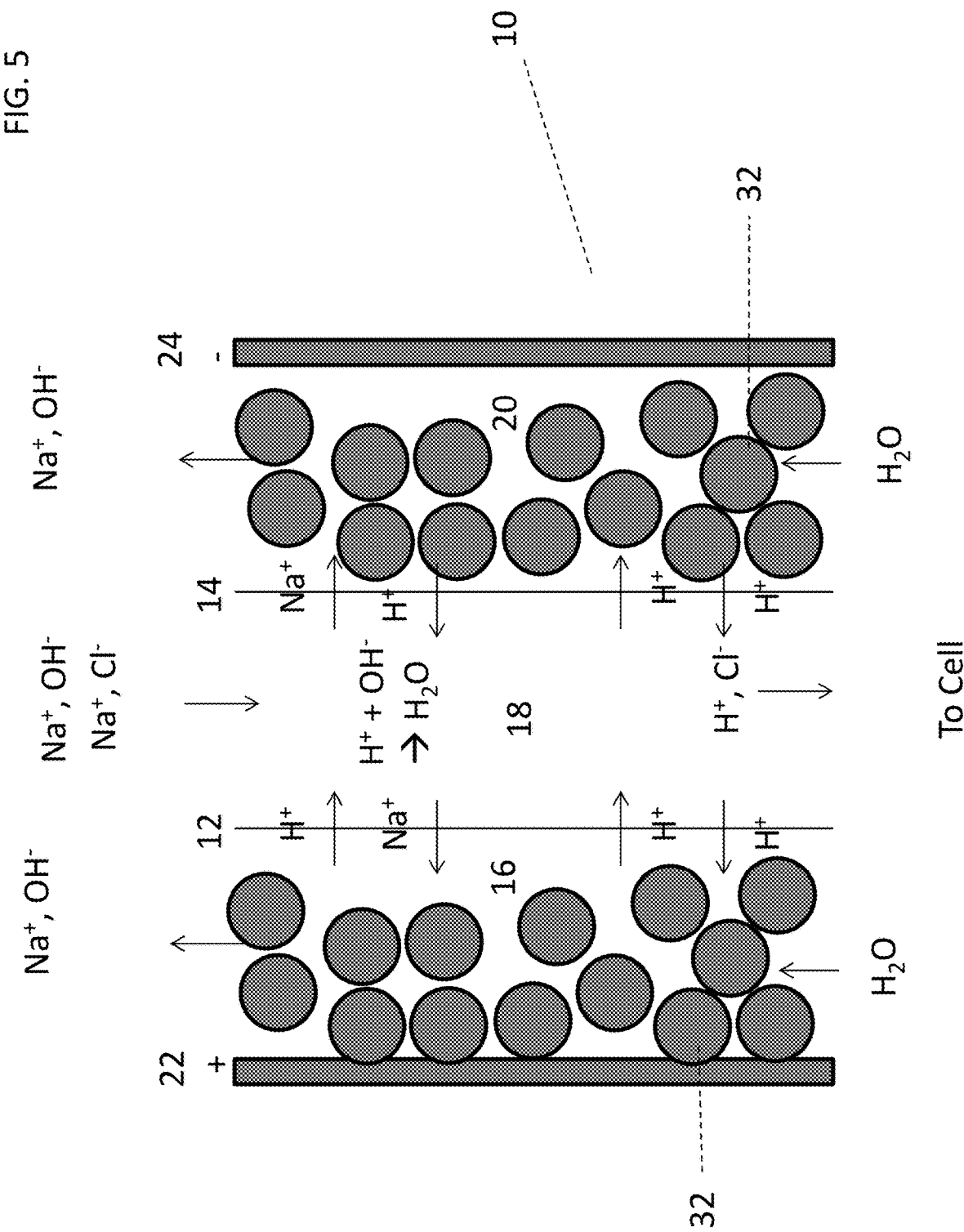
FIG. 5 illustrates an electrolytic device according to the invention including catalyst in two channels of a three channel device and operated with an A/C voltage.

In another method using the three channel suppressor of FIG. 1, instead of using DC current as illustrated, an alternating (A/C) current is used. The flow of electric charge is reversed periodically in an A/C setup. Therefore the electrolytic water splitting reactions are constantly reversed in the two regenerant channels 16 and 20 due to the A/C voltage supplied from an A/C current source (Frequency of 60 Hz) and both hydrogen and oxygen gas are created constantly on the surface of the electrodes in both channels. FIG. 3 illustrates the first half of the cycle of the A/C voltage. The usual waveform is a sine wave for an electric power circuit. In this case as shown for the device of FIG. 1, the electrode 22 is an anode generating hydronium and oxygen gas, while the electrode 24 is a cathode generating hydroxide and hydrogen gas. The sodium ions are driven towards electrode 24. FIG. 4 illustrates the second half of the cycle of the A/C voltage. In this case the polarity is reversed and the electrode 22 is a cathode generating hydroxide and hydrogen gas while the electrode 24 is an anode generating hydronium and oxygen gas. The sodium ions are driven towards the electrode 22. With an A/C applied voltage the sodium ions are driven on both sides of the eluent channel 18. FIG. 5 shows the case when the channels 16 and 20 are packed with catalyst media as per the present invention. Under these conditions the hydrogen and oxygen gases generated during each half cycle in channels 16 and 20 are combined to form water.

A recycle mode of operation can be used in which the effluent from the detector is split and is routed back into the suppressor regenerant channels as in FIG. 1 of U.S. Pat. No. 6,077,434. When an A/C voltage is applied due to the water splitting reactions there is formation of oxygen gas at the anode designated as electrode 22 and hydrogen gas at the cathode designated as electrode 24, as shown in FIG. 3. When the polarity is reversed due to the A/C cycle, the formation of the hydrogen gas now occurs at the surface of electrode 22 and oxygen gas is formed on the surface of electrode 24, as shown in FIG. 4. The catalyst when present in the regenerant channels catalytically recombines the electrolytic gases to deionized water in both channels. Suitable the applied voltage 'v' are preferably 1.5 V<v<120 V, more preferably 2 V<v<10 V and most preferably 2 V<v<6 V. In general, the invention is applicable to the use of catalyst in at least one channel of an electrolytic device. The catalyst may also be used in one or more channels to combine hydrogen and oxygen gas to form water. The invention has been described for a three-channel suppressor device with two charged barriers and for a two channel suppressor device with one charged barrier.

The invention also is applicable to other electrolytic devices of the foregoing general type for uses other than suppression. For example, the invention is also applicable to salt convertor devices, e.g. as illustrated in U.S. Pat. No. 6,752,927. Referring to FIG. 1 of this patent if the channel 28 is filled with catalyst as per the present invention then it would aid in combining the oxygen gas and hydrogen gas as per the present invention. The invention is also applicable to water purifier devices disclosed in U.S. Pat. No. 6,808,608 (the "'608 patent"). Referring to FIG. 1 of the '608 patent, channels 20 and 22 can be filled with the catalyst of the present invention to combine the oxygen gas and hydrogen gas as per the present invention. The invention is also applicable to aqueous stream purifier devices disclosed in U.S. Pat. No. 7,704,749. Referring to FIG. 4 flow channels 78 and 80 can be filled with the catalyst of the present invention to combine the oxygen and hydrogen gas as per the present invention. The invention is also applicable to ion detector systems disclosed in U.S. Pat. No. 8,293,099. Referring to FIG. 5, flow channels 116 and 120 can be filled with the catalyst of the present invention to combine the oxygen and hydrogen gas as per the present invention.

The invention is also applicable to sample pre-treatment devices, e.g. as illustrated in U.S. Pat. No. 5,597,481. Referring to FIG. 4 channels 47 and 49 can be filled with the catalyst of the present invention to combine the oxygen and hydrogen gas as per the present invention.

In U.S. Pat. No. 8,133,373 electrochemically driven pumps are disclosed. Referring to FIG. 1, flanking the outside of membranes 18 and 20 are compartments 22 and 24, which serve to contain water source reservoirs. By packing these compartments with catalyst resin as per the present invention the electrolytic gases generated in this chamber will be catalytically converted to deionized water.

Thus the present invention is applicable to any electrolytic device when the catalyst is used to recombine the electrolysis gases such as hydrogen and oxygen to water in the regenerant channels and attain the benefits of low resistance and low wattage with reduced peroxide formation within the device. In order to illustrate the present invention, the following non-limiting examples of its practice are provided.

Example 1

A three channel suppressor device design of the prior art such as described in U.S. Pat. No. 6,077,434 was modified as per the present invention by packing the regenerant channels with catalyst resin and the suppressor was tailored for 2 mm operation. The catalyst resin used in this work was based on a cation exchange resin substrate that was treated with an appropriate monomer as described in Example 3 of U.S. Pat. No. 7,585,679 to create a layer of catalyst material ontop of the resin surface. The cation exchange capacity was 2 meqv/g and was reduced to about 1 meqv/g after the catalyst was attached to the substrate resin.

The device comprised of two cation exchange membranes defining the eluent channel. Two PEEK spacer plates with suitable cavities were used as the regenerant channels and formed the regenerant channel with the ion exchange membranes defining the regenerant channel on either side of the eluent channel. Two platinum electrodes were placed in the regenerant channels. The catalyst resin approximately 0.3 g was packed into each of the regenerant channel of the suppressor on top of the electrode. The PEEK plates also served as the exterior plate for clamping the device. The eluent channel was packed with a cation exchange screen gasket where the gasket defined the fludic pathway for the eluent. The two platinum electrodes were connected to platinum wires and then routed to suitable wires to make a connection with a power supply. A DC power supply was used to supply the current required for this work.

The inlet of the eluent channel of the suppressor from above was connected to a 2 mm IonPac AS15 column outlet and the outlet of the suppressor eluent channel was connected to a conductivity cell. The effluent from the conductivity cell was routed back via a line that was connected first to the anode regenerant compartment inlet and the outlet of this compartment was routed to the inlet of the cathode regenerant compartment inlet. The outlet from the cathode regenerant compartment outlet was routed to an ERC 10 controller from Thermo Fisher Scientific and then routed to waste. The ERC 10 controller had a bubble sensor that was used to monitor any residual bubbles in the suppressor waste. 38 mM KOH was used as the eluent at a flow rate of 0.3 ml/min and the suppressor as per the present invention was operated with a constant current of 50 mA. A sample comprising of five anions namely fluoride (2 mg/L), chloride (3 mg/L), nitrate (10 mg/L), phosphate (15 mg/L) and sulfate (15 mg/L) was injected using a 5 µL injection loop.

Figure 6:
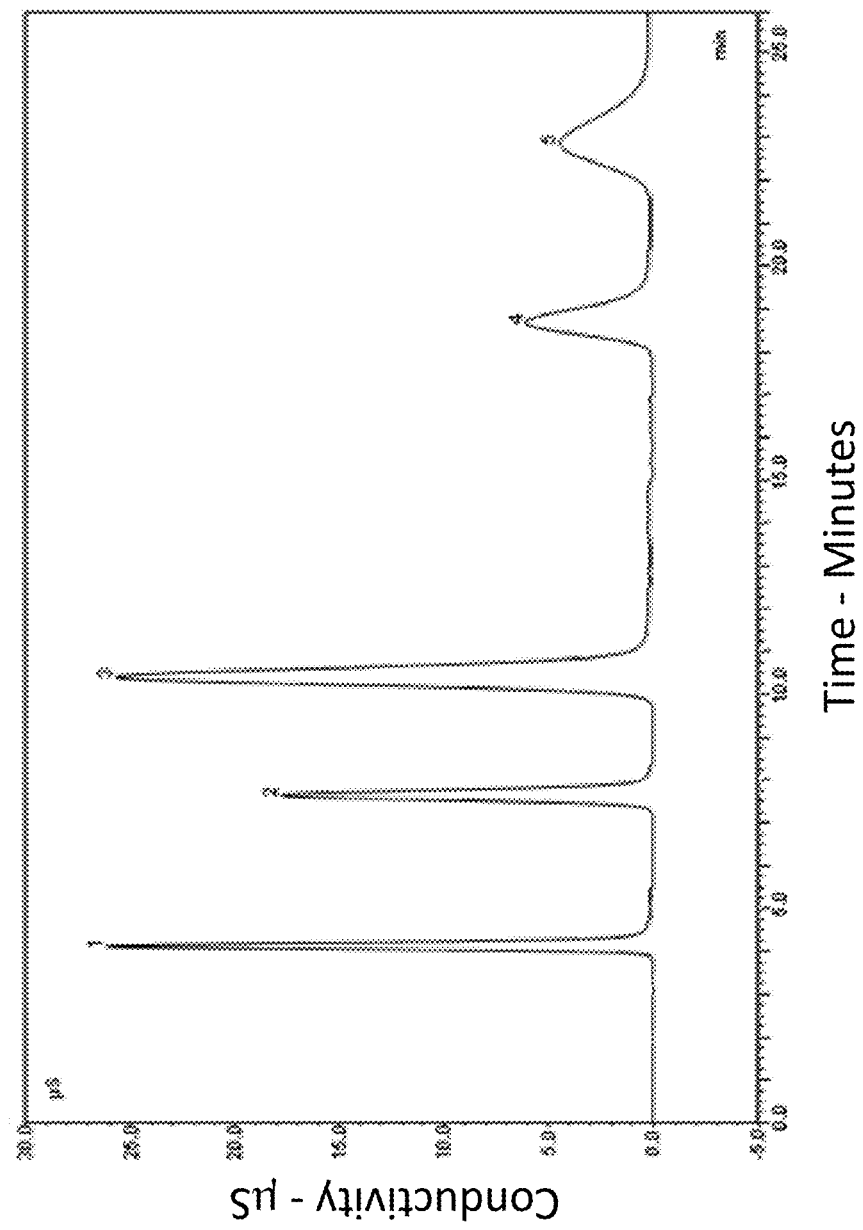
FIG. 6 is a chromatogram illustrating experimental results using the present invention.

A sample comprising of five anions was analyzed and five peaks were detected namely fluoride (Peak 1, 2 mg/L), chloride (Peak 2, 3 mg/L), nitrate (Peak 4, 10 mg/L), phosphate (Peak 5, 15 mg/L) and sulfate (Peak 3, 15 mg/L) with good S/N ratio as shown in FIG. 6. No gas was detected in the regenerant channel since the electrolytic gases were catalytically recombined in the cathode chamber to form water. The ERC 10 controller did not show any bubbles since the catalyst resin recombined the electrolytic gases in an efficient manner.

The device voltage was approximately 3.1 V much smaller than a standard commercial suppressor which showed a voltage of 4.5 V when operated under the same conditions.

Example 2

In order to verify the catalytic function the waste from the regenerant channel of Example 1 was also monitored for hydrogen peroxide removal. An IonPac PA20 column (4×250 mm) was used for the peroxide analysis at 30° C. using an eluent comprising of 100 mM NaOH at a flow rate of 0.5 ml/min and in conjunction with an electrochemical detector. A gold electrode was used as an electrode and detection was pursued with a preloaded quadraupole waverform with AgCl reference electrodes. The injection loop size was 10 µL. A waste effluent generated from a commercial ASRS 300 was also analyzed for peroxide content for comparison purposes as shown in Table 1. The results indicated a removal of about 68% peroxide with the device of the present invention. It should be noted that the level of peroxide removal can be increased by increasing the amount of catalyst resin in the regenerant channels.

TABLE 1

| Suppressor Used | Peak Area Counts |
| --- | --- |
| SRS 300 (prior art suppressor) | 10.850 |
| Suppressor of the present invention | 3,458 |

Example 3

A 4 mm suppressor device was assembled similar to the 2 mm unit described in FIG. 1 except the eluent and channel dimensions were tailored for the 4 mm operation. The regenerant channels were packed with roughly 2.4 g of catalyst resin in each channel. This amount was roughly two fold higher than the relative amounts used for a 2 mm scale suppressor in example 1. The device was tested with a modified regenerant plumbing. The cell outlet was routed to a "Tee junction" to split the cell effluent stream into two streams and the individual streams were routed to the anode and cathode regenreant channels of the device of FIG. 1. The device was then operated with an A/C power supply under constant voltage conditions. An IonPac AS15 4×250 mm column was used as the separator column and operated using a 38 mM KOH eluent at 1.2 ml/min flow rate. The suppressor device of the present invention was operated at a constant voltage of 3.0 V and generated a current of approximately 120 mA. The background observed under these conditions was approximately <1 µS/cm indicating complete suppression of the 38 mM eluent. The peak to peak noise was in the 0.5 nS/cm regime indicating that the suppressor noise was considerably reduced by the embodiment of the present invention. The bubbles were monitored as before by combining the effluent from the regenerant channels using an ERC 10 controller bubble sensor. The effluent was also tested for peroxide removal. The results indicated excellent performance of the device of the present invention. No bubbles were detected as before by the ERC 10 controller. The peroxide removal was monitored similar to example 2. Near 100% removal of peroxide was observed. It should be noted that a 4 mm ASRS 300 suppressor of the prior art tested under the same conditions but with a constant current setting of 114 mA showed a background of <1 µS/cm indicating complete suppression but with a peak to peak noise of 1.5 nS/cm. Thus by catalytically combining the electrolytic gases the device of the present invention provided a three fold lower noise for this application.

What is claimed is:

1. An electrolytic device for simultaneous electrolysis and catalytic gas elimination in a single electrolytic device, said electrolytic device comprising a housing including:
   a first flow-through channel;
   a second adjacent flow-through channel, said second flow-through channel separated from said first flow-through channel by a first charged barrier having exchangeable ions capable of passing ions of only one charge, positive or negative, and capable of blocking bulk liquid flow,
   a first electrode in electrical communication with said first flow-through channel, and
   a first amount of a catalyst resin comprising a catalyst layer comprising metallic platinum coated on an exterior of a substrate, for combining hydrogen gas and oxygen gas, disposed in said first flow-through channel, in which said housing further comprises:
   a third flow-through channel adjacent to said flow-through second channel and separated therefrom by a second charged barrier having exchangeable ions capable of passing ions of said only one charge, positive or negative, and capable of blocking bulk liquid flow, in which the exchangeable ions of said first charged barrier and said second charged barrier are of the same charge,
   a second electrode being in electrical communication with said third flow-through channel,
   a second amount of the catalyst resin comprising said catalyst layer comprising the metallic platinum coated on said exterior of said substrate, for combining said hydrogen gas and said oxygen gas, disposed in said third flow-through channel, and
   a source of alternating (A/C) current in electrical communication with said first and second electrodes, for applying an A/C voltage to each of said first and second electrodes.

2. The electrolytic device of claim 1 wherein said substrate is a flow-through substrate.

3. The electrolytic device of claim 1 further comprising a conduit disposed between said first flow-through channel and said third flow through-channel.

4. The electrolytic device of claim 1 in which said first catalyst resin is also for removing hydrogen peroxide.

5. The electrolytic device of claim 4 wherein said second amount of the catalyst resin disposed in the third flow-through channel is also for removing hydrogen peroxide.

* * * * *